US010465778B2

(12) United States Patent
Kwon et al.

(10) Patent No.: US 10,465,778 B2
(45) Date of Patent: Nov. 5, 2019

(54) PLANETARY GEAR TRAIN OF AUTOMATIC TRANSMISSION FOR VEHICLE (71) Applicants: Hyundai Motor Company, Seoul (KR); Kia Motors Corporation, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 66 days.

(21) Appl. No.: 15/820,290

(22) Filed: Nov. 21, 2017

(65) Prior Publication Data

US 2019/0085959 A1 Mar. 21, 2019

(30) Foreign Application Priority Data

Sep. 20, 2017 (KR) .......................... 10-2017-0121433

(51) Int. Cl.
*F16H 3/66* (2006.01)
*F16H 37/04* (2006.01)
*F16H 3/08* (2006.01)

(52) U.S. Cl.
CPC ............. *F16H 37/042* (2013.01); *F16H 3/08* (2013.01); *F16H 3/663* (2013.01);
(Continued)

(58) Field of Classification Search
None
See application file for complete search history.

(56) References Cited

U.S. PATENT DOCUMENTS 6,190,280 B1 * 2/2001 Horsch ................. F16H 37/042
475/209
2008/0103002 A1 * 5/2008 Holmes ................. B60K 6/365
475/5
(Continued)

FOREIGN PATENT DOCUMENTS

JP 2015-224756 A 12/2015
KR 10-1684516 B1 12/2016
KR 10-1713733 B1 3/2017

*Primary Examiner* — Justin Holmes
(74) *Attorney, Agent, or Firm* — Morgan, Lewis & Bockius LLP (57) ABSTRACT A planetary gear train of an automatic transmission for a vehicle may include: an input shaft receiving torque of an engine; an output shaft outputting torque; a direction changer disposed on an input shaft side and transmitting the torque of the engine to the input shaft with or without change of rotation direction, or disposed on an output shaft side and outputting the torque of the output shaft with or without change of rotation direction; a first planetary gear set including first, second and third rotation elements; a compound planetary gear set including fourth, fifth, sixth, and seventh rotation elements by combining second and third planetary gear sets; a fourth planetary gear set including eighth, ninth, and tenth rotation elements.

16 Claims, 4 Drawing Sheets (52) U.S. Cl.
CPC ............... *F16H 2003/0822* (2013.01); *F16H 2037/049* (2013.01); *F16H 2200/0073* (2013.01); *F16H 2200/0082* (2013.01); *F16H 2200/2012* (2013.01); *F16H 2200/2023* (2013.01); *F16H 2200/2046* (2013.01)

(56) References Cited

U.S. PATENT DOCUMENTS

| | | | | |
|---|---|---|---|---|
| 2009/0017964 | A1* | 1/2009 | Phillips | F16H 3/666 475/275 |
| 2014/0364268 | A1* | 12/2014 | Akerblom | F16H 47/04 475/275 |
| 2015/0018153 | A1* | 1/2015 | Stalberg | F04B 49/103 475/33 |
| 2018/0087609 | A1* | 3/2018 | Horen | F16H 3/66 |

* cited by examiner

| Speed stages | | SL | | Engaging elements | | | | | | Gear ratio |
|---|---|---|---|---|---|---|---|---|---|---|
| | | FDG | RDG | C1 | C2 | C3 | C4 | B1 | B2 | |
| Forward speed stages | D1 | ● | | | | ● | ● | | ● | 4.246 |
| | D2 | ● | | ● | | | ● | | ● | 3.940 |
| | D3 | ● | | | ● | | ● | | ● | 3.679 |
| | D4 | ● | | ● | ● | | | | ● | 2.952 |
| | D5 | ● | | | ● | ● | | | ● | 2.546 |
| | D6 | ● | | | ● | ● | ● | | | 1.000 |
| | D7 | ● | | ● | ● | ● | | | | 0.623 |
| | D8 | ● | | | ● | | | ● | | 0.524 |
| | D9 | ● | | ● | | | ● | ● | | 0.347 |
| | D10 | ● | | | | ● | ● | ● | | 0.283 |
| | D11 | ● | | | | | ● | ● | | 0.208 |

FIG. 2B

| Speed stages | SL | | Engaging elements | | | | | | Gear ratio |
|---|---|---|---|---|---|---|---|---|---|
| | FDG | RDG | C1 | C2 | C3 | C4 | B1 | B2 | |
| Reverse speed stages | REV1 | | ● | | | ● | ● | | ● | -4.246 |
| | REV2 | | ● | ● | | | ● | | ● | -3.940 |
| | REV3 | | ● | ● | ● | | ● | | ● | -3.679 |
| | REV4 | | ● | | ● | | | | ● | -2.952 |
| | REV5 | | ● | | ● | | | | ● | -2.546 |
| | REV6 | | ● | ● | ● | ● | | | | -1.000 |
| | REV7 | | ● | ● | ● | | | ● | | -0.623 |
| | REV8 | | ● | ● | | | | ● | | -0.524 |
| | REV9 | | ● | ● | | | ● | ● | | -0.347 |
| | REV10 | | ● | | | | ● | ● | | -0.283 |
| | REV11 | | ● | | | ● | ● | ● | | -0.208 |

FIG. 3

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2017-0121433 filed on Sep. 20, 2017, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving eleven forward speeds and eleven reverse speeds with a minimum number of constituent elements being used and improves silent driving of the vehicle by using operation point positioned at a low engine speed.

Description of Related Art

Generally, an automatic transmission achieving more speed stages has been developed to enhancing fuel economy and optimizing drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve maximum efficiency with a small number of components may be important in order to increase a fuel economy enhancement effect through the multiple-speeds.

In this background, in recent years, 8-speed automatic transmissions tend to be implemented and the research and development of a planetary gear train capable of implementing more speed stages has also been actively conducted.

However, a conventional 8-speed automatic transmission typically includes three to four planetary gear sets and five to seven engaging elements (friction elements). In this case, since the length of the automatic transmission increases, mountability may be deteriorated.

Recently, one planetary gear set is disposed above another planetary gear set, but structures of automatic transmissions to which parallel planetary gear sets is applied are very limited.

In another way, dog clutches instead of engaging elements of wet-type are used. However, shift feel can be deteriorated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving eleven forward speeds and eleven reverse speeds with a minimum number of constituent elements being used.

Various aspects of the present invention are directed to providing a planetary gear train of an automatic transmission for a vehicle having further advantages of improving silent driving of the vehicle by use of operation point positioned at a low rotation speed region of an engine.

A planetary gear train of an automatic transmission for a vehicle according to an exemplary embodiment of the present invention may include: an input shaft receiving torque of an engine; an output shaft outputting torque; a direction changer disposed on an input shaft side and transmitting the torque of the engine to the input shaft with or without change of rotation direction, or disposed on an output shaft side and outputting the torque of the output shaft with or without change of rotation direction; a first planetary gear set including first, second and third rotation elements; a compound planetary gear set including fourth, fifth, sixth, and seventh rotation elements by combining second and third planetary gear sets; a fourth planetary gear set including eighth, ninth, and tenth rotation elements; a first shaft fixedly connected to the second rotation element and the input shaft; a second shaft fixedly connected to the first rotation element and the ninth rotation element, and fixedly connected to the output shaft; a third shaft fixedly connected to the third rotation element; a fourth shaft fixedly connected to the fourth rotation element; a fifth shaft fixedly connected to the sixth rotation element; a sixth shaft fixedly connected to the seventh rotation element; and a plurality of shafts formed by combinations of remaining rotation elements of the fourth planetary gear set and the compound planetary gear set that are not connected to the first to sixth shafts, and selectively and respectively connected to a transmission housing.

The plurality of shafts may include: a seventh shaft fixedly connected to the fifth rotation element and the eighth rotation element and selectively connectable to the transmission housing; and an eighth shaft fixedly connected to the tenth rotation element and selectively connectable to the transmission housing, wherein the first shaft and the fifth shaft, the second shaft and the fourth shaft, the third shaft and the fifth shaft, and the third shaft and the sixth shaft are selectively and respectively connected to each other.

The planetary gear train may further include: four clutches, each of which selectively connecting any two shafts among the eight shafts; and two brakes, each of which selectively connecting the seventh shaft or the eighth shaft to the transmission housing.

The four clutches may include: a first clutch disposed between the first shaft and the fifth shaft; a second clutch disposed between the second shaft and the fourth shaft; a third clutch disposed between the third shaft and the fifth shaft; and a fourth clutch disposed between the third shaft and the sixth shaft.

The two brakes may include: a first brake disposed between the seventh shaft and the transmission housing; and a second brake disposed between the eighth shaft and the transmission housing.

The first planetary gear set is a single pinion planetary gear set, the first rotation element is a first sun gear, the second rotation element is a first planet carrier, and the third rotation element is a first ring gear. The compound planetary gear set is formed by combining the second planetary gear set being a single pinion planetary gear set and the third planetary gear set being a double pinion planetary gear set, the fourth rotation element is a second sun gear, the fifth rotation element is a third sun gear, the sixth rotation element is a common planet carrier, and the seventh rotation element is a common ring gear. The fourth planetary gear set is a single pinion planetary gear set, the eighth rotation element is a fourth sun gear, the ninth rotation element is a fourth planet carrier, and the tenth rotation element is a fourth ring gear.

The first and fourth planetary gear sets and the compound planetary gear set are disposed in a sequence of the first planetary gear set, the compound planetary gear set, and the fourth planetary gear set from an engine side.

In one aspect, the direction changer may be disposed on the input shaft. The direction changer may include a driveshaft disposed apart from the input shaft and receiving the torque of the engine; a forward gear set disposed on the driveshaft and selectively transmitting torque of the driveshaft to the input shaft without change of rotation direction; a reverse gear set disposed on the driveshaft and selectively transmitting the torque of the driveshaft to the input shaft with change of rotation direction; and a synchronizer connecting the driveshaft to the input shaft selectively through the forward gear set or the reverse gear set.

The forward gear set may include a forward drive gear rotatably disposed on the driveshaft; a forward driven gear fixedly disposed on the input shaft; and an idle gear disposed between the forward drive gear and the forward driven gear and engaged with the forward drive gear and the forward driven gear.

The reverse gear set may include a reverse drive gear rotatably disposed on the driveshaft; and a reverse driven gear fixedly disposed on the input shaft and engaged with the reverse drive gear.

The synchronizer is disposed between the forward drive gear and the reverse drive gear and is configured to selectively connect the forward drive gear or the reverse drive gear to the driveshaft.

In another aspect, the direction changer may be disposed on the output shaft. The direction changer may include a driveshaft disposed apart from the output shaft and outputting the torque of the output shaft with or without change of rotation direction; a forward gear set disposed on the output shaft and selectively transmitting the torque of the output shaft to the driveshaft without change of rotation direction; a reverse gear set disposed on the output shaft and selectively transmitting the torque of the output shaft to the driveshaft with change of rotation direction; and a synchronizer connecting the output shaft to the driveshaft selectively through the forward gear set or the reverse gear set.

The forward gear set may include a forward drive gear rotatably disposed on the output shaft; a forward driven gear fixedly disposed on the driveshaft; and an idle gear disposed between the forward drive gear and the forward driven gear and engaged with the forward drive gear and the forward driven gear.

The reverse gear set may include a reverse drive gear rotatably disposed on the output shaft; and a reverse driven gear fixedly disposed on the driveshaft and engaged with the reverse drive gear.

The synchronizer is disposed between the forward drive gear and the reverse drive gear and is configured to selectively connect the forward drive gear or the reverse drive gear to the output shaft.

A planetary gear train of an automatic transmission for a vehicle according to another exemplary embodiment of the present invention may include: an input shaft receiving torque of an engine; an output shaft outputting torque; a direction changer disposed on an input shaft side and transmitting the torque of the engine to the input shaft with or without change of rotation direction, or disposed on an output shaft side and outputting the torque of the output shaft with or without change of rotation direction; a first planetary gear set including first, second and third rotation elements; a compound planetary gear set including fourth, fifth, sixth, and seventh rotation elements by combining second and third planetary gear sets; and a fourth planetary gear set including eighth, ninth, and tenth rotation elements, wherein the first rotation element is fixedly connected to the ninth rotation element and is fixedly connected to the output shaft, the second rotation element is fixedly connected to the input shaft and is selectively connectable to the sixth rotation element, the third rotation element is selectively connectable respectively to the sixth rotation element and the seventh rotation element, the fourth rotation element is selectively connectable to the first rotation element, the fifth rotation element is fixedly connected to the eighth rotation element and is selectively connectable to a transmission housing, and the tenth rotation element is selectively connectable to the transmission housing.

The planetary gear train may further include: four clutches, each selectively connecting any one rotation element to another rotation element; and two brakes, each selectively connecting the eighth rotation element or the tenth rotation element to the transmission housing.

The four clutches include a first clutch disposed between the second rotation element and the sixth rotation element; a second clutch disposed between the first rotation element and the fourth rotation element; a third clutch disposed between the third rotation element and the sixth rotation element; and a fourth clutch disposed between the third rotation element and the seventh rotation element.

The two brakes include a first brake disposed between the eighth rotation element and the transmission housing; and a second brake disposed between the tenth rotation element and the transmission housing.

The first planetary gear set is a single pinion planetary gear set, the first rotation element is a first sun gear, the second rotation element is a first planet carrier, and the third rotation element is a first ring gear. The compound planetary gear set is formed by combining the second planetary gear set being a single pinion planetary gear set and the third planetary gear set being a double pinion planetary gear set, the fourth rotation element is a second sun gear, the fifth rotation element is a third sun gear, the sixth rotation element is a common planet carrier, and the seventh rotation element is a common ring gear. The fourth planetary gear set is a single pinion planetary gear set, the eighth rotation element is a fourth sun gear, the ninth rotation element is a fourth planet carrier, and the tenth rotation element is a fourth ring gear.

The first and fourth planetary gear sets and the compound planetary gear set are disposed in a sequence of the first planetary gear set, the compound planetary gear set, and the fourth planetary gear set from an engine side.

In one aspect, the direction changer may be disposed on the input shaft. The direction changer may include a driveshaft disposed apart from the input shaft and receiving the torque of the engine; a forward gear set disposed on the driveshaft and selectively transmitting torque of the driveshaft to the input shaft without change of rotation direction; a reverse gear set disposed on the driveshaft and selectively transmitting the torque of the driveshaft to the input shaft with change of rotation direction; and a synchronizer connecting the driveshaft to the input shaft selectively through the forward gear set or the reverse gear set.

The forward gear set may include a forward drive gear rotatably disposed on the driveshaft; a forward driven gear fixedly disposed on the input shaft; and an idle gear disposed between the forward drive gear and the forward driven gear and engaged with the forward drive gear and the forward driven gear.

The reverse gear set may include a reverse drive gear rotatably disposed on the driveshaft; and a reverse driven gear fixedly disposed on the input shaft and engaged with the reverse drive gear.

The synchronizer is disposed between the forward drive gear and the reverse drive gear and is configured to selectively connect the forward drive gear or the reverse drive gear to the driveshaft.

In another aspect, the direction changer may be disposed on the output shaft.

The direction changer may include a driveshaft disposed apart from the output shaft and outputting the torque of the output shaft with or without change of rotation direction; a forward gear set disposed on the output shaft and selectively transmitting the torque of the output shaft to the driveshaft without change of rotation direction; a reverse gear set disposed on the output shaft and selectively transmitting the torque of the output shaft to the driveshaft with change of rotation direction; and a synchronizer connecting the output shaft to the driveshaft selectively through the forward gear set or the reverse gear set.

The forward gear set may include a forward drive gear rotatably disposed on the output shaft; a forward driven gear fixedly disposed on the driveshaft; and an idle gear disposed between the forward drive gear and the forward driven gear and engaged with the forward drive gear and the forward driven gear.

The reverse gear set may include a reverse drive gear rotatably disposed on the output shaft; and a reverse driven gear fixedly disposed on the driveshaft and engaged with the reverse drive gear.

The synchronizer is disposed between the forward drive gear and the reverse drive gear and is configured to selectively connect the forward drive gear or the reverse drive gear to the output shaft.

The planetary gear train according to the exemplary embodiments of the present invention may achieve eleven forward speeds and eleven reverse speeds by combining two simple planetary gear sets and one compound planetary gear set with six engaging elements.

Furthermore, the planetary gear train according to the exemplary embodiments of the present invention may achieve speed stages suitable to a rotation speed of the engine due to multiple-speed stages of the automatic transmission. Silent driving of the vehicle may be improved by use of operation point positioned at a low rotation speed region of the engine.

Furthermore, the planetary gear train according to the exemplary embodiments of the present invention may maximize driving efficiency of the engine due to multiple-speed stages and improve power delivery performance and fuel economy.

Furthermore, since the planetary gear train according to the exemplary embodiment of the present invention can achieve eleven forward speeds and eleven reverse speeds, the planetary gear train is applicable to industrial machinery including agricultural machinery, construction equipment, etc.

The methods and apparatuses of the present invention have other features and advantages which will be apparent from or are set forth in more detail in the accompanying drawings, which are incorporated herein, and the following Detailed Description, which together serve to explain certain principles of the present invention.

Other effects obtainable or predictable from the exemplary embodiments of the present invention will be explicitly or implicitly described in a DETAILED DESCRIPTION section. That is, various effects predictable from the exemplary embodiments of the present invention will be described in the DETAILED DESCRIPTION section.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described more specifically with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

Figure 1:
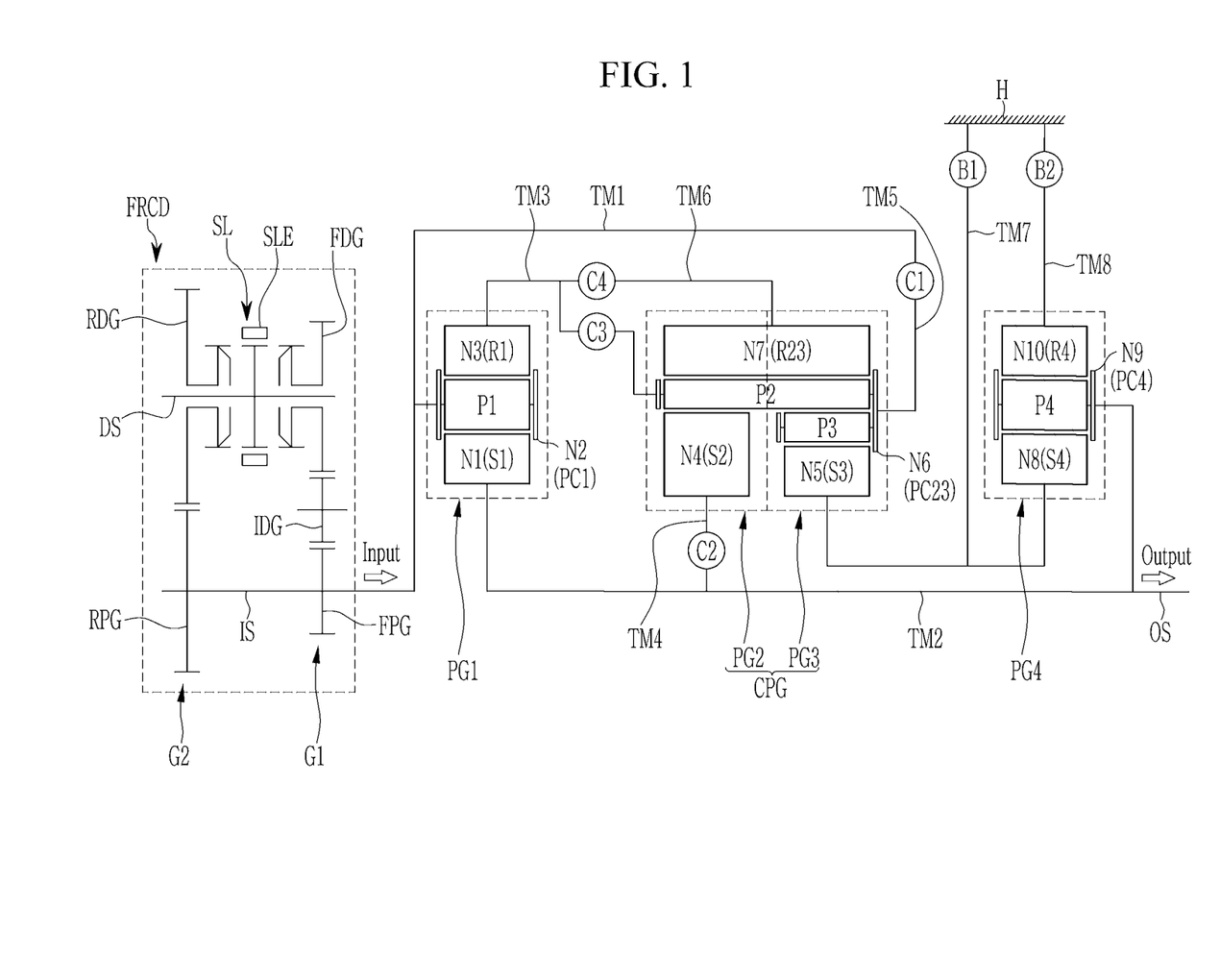
FIG. 1 is a schematic diagram of a planetary gear train according to the various exemplary embodiments of the present invention.

FIG. 1 is a schematic diagram of a planetary gear train according to the various exemplary embodiments of the present invention.

Referring to FIG. 1, a planetary gear train according to the various exemplary embodiments of the present invention includes first, second, third and fourth planetary gear sets PG1, PG2, PG3, and PG4 disposed on the same axis, an input shaft IS, an output shaft OS, eight shafts TM1 to TM8 connected to at least one rotation element of the first, second, third and fourth planetary gear sets PG1, PG2, PG3, and PG4, engaging elements including four clutches C1 to C4 and two brakes B1 and B2, a direction changer FRCD, and a transmission housing H.

Some of rotation elements of the second and third planetary gear sets PG2 and PG3 are integrally formed or fixedly connected to each other to form one compound planetary gear set CPG.

Torque input from an engine to the input shaft IS is changed by cooperation of the first, second, third and fourth planetary gear sets PG1, PG2, PG3, and PG4, and the changed torque is output through the output shaft OS.

According to the exemplary embodiments of the present invention, the planetary gear sets are disposed in a sequence of the first planetary gear set PG1, the compound planetary gear set CPG including the second and third planetary gear sets PG2 and PG3, and the fourth planetary gear set PG4 from an engine side.

The input shaft IS is an input member and a torque from a crankshaft of the engine is torque-converted through a torque converter to be input into the input shaft IS. In some exemplary embodiments, the input shaft IS may be included in the direction changer FRCD disposed thereon. Furthermore, the torque of the engine may be transmitted to the input shaft IS through the direction changer FRCD. Therefore, the input shaft IS signifies an input element of the planetary gear train.

The output shaft OS is an output element, is disposed in parallel with the input shaft IS, and transmits driving torque to a driving wheel through a differential apparatus. In some exemplary embodiments, the output shaft OS may be included in the direction changer FRCD disposed thereon. Furthermore, the changed driving torque may be transmitted to the differential apparatus through the direction changer FRCD. Therefore, the output shaft OS signifies an output element of the planetary gear train.

The first planetary gear set PG1 is a single pinion planetary gear set and includes a first sun gear S1 as a first rotation element N1, a first planet carrier PC1 as a second rotation element N2 rotatably supporting a plurality of first pinion gears P1 engaged with the first sun gear S1, and a first ring gear R1 as a third rotation element N3 engaged with the plurality of first pinion gears P1 and operably connected to the first sun gear S1.

The compound planetary gear set CPG is formed by combining the second planetary gear set PG2 being a single pinion planetary gear set and the third planetary gear set PG3 being a double pinion planetary gear set such that the compound planetary gear set CPG is a planetary gear set of Ravingneaux type in which a ring gear and a planet carrier are shared in common.

Therefore, the compound planetary gear set CPG has four rotation elements including a ring gear, a planet carrier and two sun gears. The compound planetary gear set CPG includes a second sun gear S2 as a fourth rotation element N4 engaged with a plurality of long pinion gears P2, a third sun gear S3 as a fifth rotation element N5 engaged with a plurality of short pinion gears P3, a common planet carrier PC23 as a sixth rotation element N6 rotatably supporting the plurality of long pinion gears P2 engaged with the second sun gear S2 and the plurality of short pinion gears P3 engaged with the third sun gear S3, and a common ring gear R23 as a seventh rotation element N7 engaged with the plurality of long pinion gears P2 and operably connected to the second and third sun gears S2 and S3.

The fourth planetary gear set PG4 is a single pinion planetary gear set and includes a fourth sun gear S4 as an eighth rotation element N8, a fourth planet carrier PC4 as a ninth rotation element N9 rotatably supporting a plurality of fourth pinion gears P4 evenly disposed on and externally engaged with an external circumference the fourth sun gear S4, and a fourth ring gear R4 as a tenth rotation element N10 internally engaged with the plurality of fourth pinion gears P4 and operably connected to the fourth sun gear S4.

Here, the term "operably connected" or the like signifies at least two members are directly or indirectly connected to each other. However, two members that are operably connected to each other do not always rotate with the same rotation speed and in the same rotation direction thereof.

The first rotation element N1 is fixedly connected to the ninth rotation element N9, and the fifth rotation element N5 is fixedly connected to the eighth rotation element N8 such that the first and fourth planetary gear sets PG1 and PG4 and the compound planetary gear set CPG include eight shafts TM1 to TM8.

Here, the term "fixedly connected" or the like signifies at least two members are connected to each other to always rotate without rotation speed difference. That is, at least two members that are fixedly connected to each other always rotate with the same rotation speed and in the same rotation direction thereof. Therefore, it is to be understood by a person of an ordinary skill in the art that the term "fixedly connected" or the like differs the term "operably connected" or the like.

The eight shafts TM1 to TM8 will be described in further detail.

The first shaft TM1 is fixedly connected to the second rotation element N2 (first planet carrier PC1) and is fixedly connected to the input shaft IS to be continuously operated as an input element.

The second shaft TM2 is fixedly connected to the first rotation element N1 (first sun gear S1) and the ninth rotation element N9 (fourth planet carrier PC4) and is fixedly connected to the output shaft OS to be continuously operated as an output element.

The third shaft TM3 is fixedly connected to the third rotation element N3 (first ring gear R1).

The fourth shaft TM4 is fixedly connected to the fourth rotation element N4 (second sun gear S2).

The fifth shaft TM5 is fixedly connected to the sixth rotation element N6 (common planet carrier PC23).

The sixth shaft TM6 is fixedly connected to the seventh rotation element N7 (common ring gear R23).

The seventh shaft TM7 is fixedly connected to the fifth rotation element N5 (third sun gear S3) and the eighth rotation element N8 (fourth sun gear S4).

The eighth shaft TM8 is fixedly connected to the tenth rotation element N10 (fourth ring gear R4).

The eight shafts TM1 to TM8 fixedly connects a plurality of rotation elements among the rotation elements of the planetary gear sets PG1, PG2, PG3, and PG4 with each other, are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

Here, the term "selectively connectable" or the like signifies a plurality of shafts including the input shaft and the output shaft are connectable to each other through at least one of the engaging elements to rotate with the same rotation speed and in the same rotation direction, or are connectable to the transmission housing through at least one of the engaging elements to be fixed to the transmission housing.

In other words, in a case that the engaging element selectively connects a plurality of shafts to each other, the plurality of shafts rotate with the same rotation speed and in the same rotation direction when the engaging element operates but the plurality of shafts are disconnected from each other when the engaging element is released.

Furthermore, in a case that the engaging element selectively connects any one shaft to the transmission housing, the corresponding shaft is fixedly connected to the transmission housing when the engaging element operates but the corresponding shaft is rotatable when the engaging element is released.

Herein, the first shaft TM1 is selectively connectable to the fifth shaft TM5, the second shaft TM2 is selectively connectable to the fourth shaft TM4, and the third shaft TM3 is selectively connectable to each of the fifth shaft TM5 and sixth shaft TM6.

Furthermore, each of the seventh shaft TM7 and the eighth shaft TM8 is selectively connectable to the transmission housing H to be operated as a selective fixed element.

Four clutches C1, C2, C3, and C4 that are engaging elements are disposed at portions at which any two shafts among the eight shafts TM1 to TM8 including the input shaft IS and the output shaft OS are selectively connectable to each other.

Furthermore, two brakes B1 and B2 that are engaging elements are disposed at portions at which any one shaft among the eight shafts TM1 to TM8 is selectively connectable to the transmission housing H.

Arrangement of the four clutches C1 to C4 and two brakes B1 to B2 will be described more specifically.

The first clutch C1 is disposed between the first shaft TM1 and the fifth shaft TM5 and selectively connects the first shaft TM1 to the fifth shaft TM5.

The second clutch C2 is disposed between the second shaft TM2 and the fourth shaft TM4 and selectively connects the second shaft TM2 to the fourth shaft TM4.

The third clutch C3 is disposed between the third shaft TM3 and the fifth shaft TM5 and selectively connects the third shaft TM3 to the fifth shaft TM5.

The fourth clutch C4 is disposed between the third shaft TM3 and the sixth shaft TM6 and selectively connects the third shaft TM3 to the sixth shaft TM6.

The first brake B1 is disposed between the seventh shaft TM7 and the transmission housing H and selectively connects and fixes the seventh shaft TM7 to the transmission housing H.

The second brake B2 is disposed between the eighth shaft TM8 and the transmission housing H and selectively connects and fixes the eighth shaft TM8 to the transmission housing H.

The engaging elements including the first, second, third and fourth clutches C1, C2, C3, and C4 and the first and second brakes B1 and B2 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control device can be configured as the engaging elements.

According to the various exemplary embodiments of the present invention, the direction changer FRCD is disposed on an input side of the planetary gear train.

The direction changer FRCD further includes a driveshaft DS receiving the driving torque of the engine, a forward gear set G1, and a reverse gear set G2, and the driveshaft DS is disposed apart from and in parallel with the input shaft IS.

The forward gear set G1 includes a forward drive gear FDG rotatably disposed on the driveshaft DS, a forward driven gear FPG fixedly disposed on the input shaft IS, and an idle gear IDG disposed between the forward drive gear FDG and the forward driven gear FPG and engaged with the forward drive gear FDG and the forward driven gear FPG.

The reverse gear set G2 includes a reverse drive gear RDG rotatably disposed on the driveshaft DS and a reverse driven gear RPG fixedly disposed on the input shaft IS and engaged with the reverse drive gear RDG.

Furthermore, a synchronizer SL is disposed between the forward drive gear FDG and the reverse drive gear RDG and selectively connects the forward drive gear FDG or the reverse drive gear RPG to the driveshaft DS.

Since the synchronizer SL is well-known to a person of an ordinary skill in the art, detailed description thereof will be omitted. A sleeve SLE used in the synchronizer SL, as well-known to a person of an ordinary skill in the art, is driven by an additional actuator, and the actuator is controlled by a transmission control device.

Figure 2A:
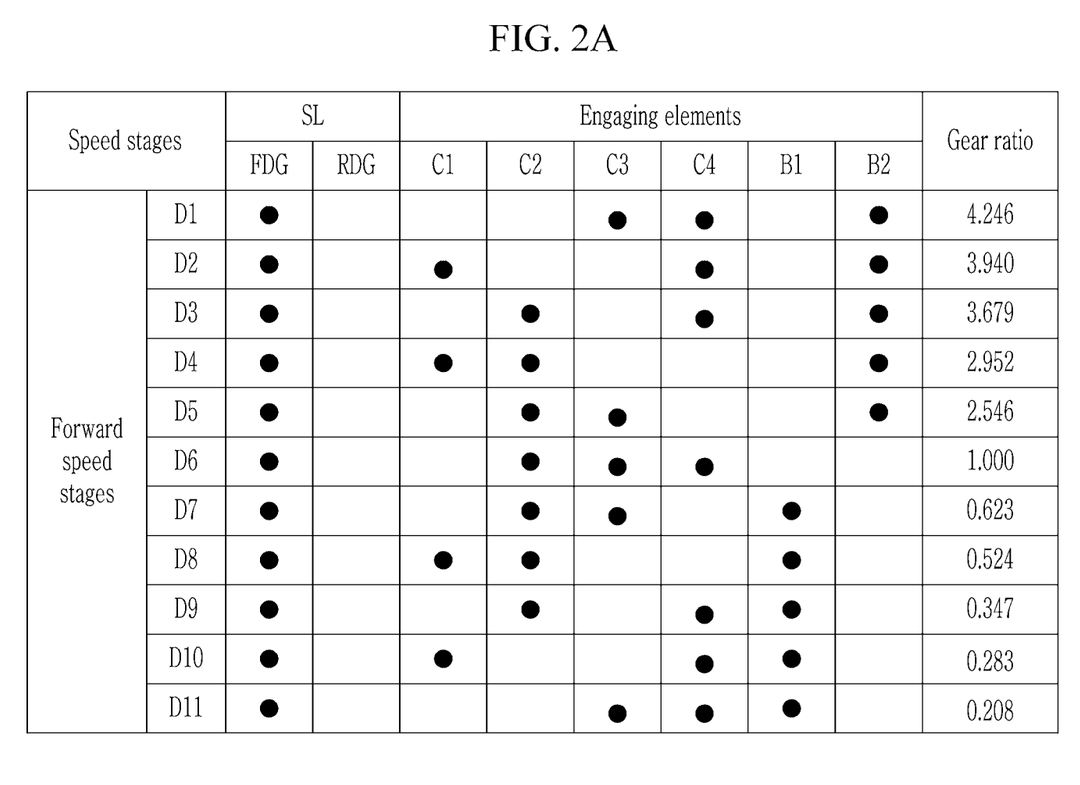
FIGS. 2A and 2B are operation charts of engaging elements at each speed stage in the planetary gear train according to the various exemplary embodiments of the present invention.
Figure 2B:
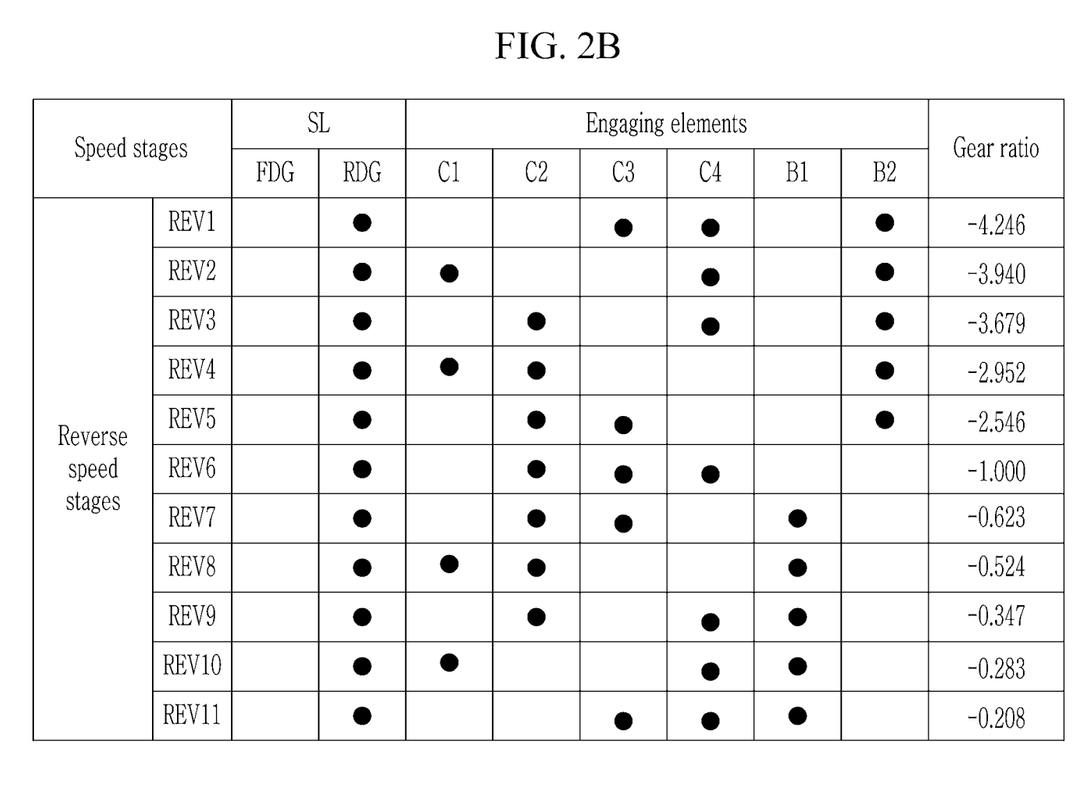

FIGS. 2A and 2B are operation charts of engaging elements at each speed stage in the planetary gear train according to the various exemplary embodiments of the present invention.

Referring to FIGS. 2A and 2B, three engaging elements among the first, second, third and fourth clutches C1, C2, C3, and C4 and the first and second brakes B1 and B2 are operated at each speed stage in the planetary gear train according to the various exemplary embodiments of the present invention.

In a state that the forward drive gear FDG is connected to the driveshaft DS through the sleeve SLE of the synchronizer SL of the direction changer FRCD, eleven forward speeds can be achieved. In the instant case, the torque of the engine is transmitted to the input shaft IS without rotational direction change through the forward drive gear FDG, the idle gear IDG and the forward driven gear FPG.

The third and fourth clutches C3 and C4 and the second brake B2 are operated at a first forward speed D1.

In a state that the third shaft TM3 is connected to the fifth shaft TM5 and the sixth shaft TM6 by operation of the third and fourth clutches C3 and C4, the torque of the input shaft IS is input to the first shaft TM1.

At the present state, the eighth shaft TM8 is operated as the fixed element by operation of the second brake B2. Therefore, the torque of the input shaft IS is shifted into the first forward speed, and the first forward speed is output through the output shaft OS connected to the second shaft TM2.

The first and fourth clutches C1 and C4 and the second brake B2 are operated at a second forward speed D2.

In a state that the first shaft TM1 is connected to the fifth shaft TM5 by operation of the first clutch C1 and the third shaft TM3 is connected to the sixth shaft TM6 by operation of the fourth clutch C4, the torque of the input shaft IS is input to the first shaft TM1.

At the present state, the eighth shaft TM8 is operated as the fixed element by operation of the second brake B2. Therefore, the torque of the input shaft IS is shifted into the second forward speed, and the second forward speed is output through the output shaft OS connected to the second shaft TM2.

The second and fourth clutches C2 and C4 and the second brake B2 are operated at a third forward speed D3.

In a state that the second shaft TM2 is connected to the fourth shaft TM4 by operation of the second clutch C2 and the third shaft TM3 is connected to the sixth shaft TM6 by operation of the fourth clutch C4, the torque of the input shaft IS is input to the first shaft TM1.

At the present state, the eighth shaft TM8 is operated as the fixed element by operation of the second brake B2. Therefore, the torque of the input shaft IS is shifted into the third forward speed, and the third forward speed is output through the output shaft OS connected to the second shaft TM2.

The first clutch and second clutch C1 and C2 and the second brake B2 are operated at a fourth forward speed D4.

In a state that the first shaft TM1 is connected to the fifth shaft TM5 by operation of the first clutch C1 and the second shaft TM2 is connected to the fourth shaft TM4 by operation of the second clutch C2, the torque of the input shaft IS is input to the first shaft TM1.

At the present state, the eighth shaft TM8 is operated as the fixed element by operation of the second brake B2. Therefore, the torque of the input shaft IS is shifted into the fourth forward speed, and the fourth forward speed is output through the output shaft OS connected to the second shaft TM2.

The second and third clutches C2 and C3 and the second brake B2 are operated at a fifth forward speed D5.

In a state that the second shaft TM2 is connected to the fourth shaft TM4 by operation of the second clutch C2 and the third shaft TM3 is connected to the fifth shaft TM5 by operation of the third clutch C3, the torque of the input shaft IS is input to the first shaft TM1.

At the present state, the eighth shaft TM8 is operated as the fixed element by operation of the second brake B2. Therefore, the torque of the input shaft IS is shifted into the fifth forward speed, and the fifth forward speed is output through the output shaft OS connected to the second shaft TM2.

The second, third, and fourth clutches C2, C3, and C4 are operated at a sixth forward speed D6.

The second shaft TM2 is connected to the fourth shaft TM4 by operation of the second clutch C2 and the third shaft TM3 is connected to the fifth shaft TM5 and the sixth shaft TM6 by operation of the third and fourth clutches C3 and C4.

At the present time, the first and fourth planetary gear sets PG1 and PG4 and the compound planetary gear set CPG become lock-up states. In the instant case, if the torque of the input shaft IS is input to the first shaft TM1, the torque of the input shaft IS is output through the output shaft OS connected to the second shaft TM2 without rotation speed change.

The second and third clutches C2 and C3 and the first brake B1 are operated at a seventh forward speed D7.

In a state that the second shaft TM2 is connected to the fourth shaft TM4 by operation of the second clutch C2 and the third shaft TM3 is connected to the fifth shaft TM5 by operation of the third clutch C3, the torque of the input shaft IS is input to the first shaft TM1.

At the present state, the seventh shaft TM7 is operated as the fixed element by operation of the first brake B1. Therefore, the torque of the input shaft IS is shifted into the seventh forward speed, and the seventh forward speed is output through the output shaft OS connected to the second shaft TM2.

The first clutch and second clutch C1 and C2 and the first brake B1 are operated at an eighth forward speed D8.

In a state that the first shaft TM1 is connected to the fifth shaft TM5 by operation of the first clutch C1 and the second shaft TM2 is connected to the fourth shaft TM4 by operation of the second clutch C2, the torque of the input shaft IS is input to the first shaft TM1.

At the present state, the seventh shaft TM7 is operated as the fixed element by operation of the first brake B1. Therefore, the torque of the input shaft IS is shifted into the eighth forward speed, and the eighth forward speed is output through the output shaft OS connected to the second shaft TM2.

The second and fourth clutches C2 and C4 and the first brake B1 are operated at a ninth forward speed D9.

In a state that the second shaft TM2 is connected to the fourth shaft TM4 by operation of the second clutch C2 and the third shaft TM3 is connected to the sixth shaft TM6 by operation of the fourth clutch C4, the torque of the input shaft IS is input to the first shaft TM1.

At the present state, the seventh shaft TM7 is operated as the fixed element by operation of the first brake B1. Therefore, the torque of the input shaft IS is shifted into the ninth forward speed, and the ninth forward speed is output through the output shaft OS connected to the second shaft TM2.

The first and fourth clutches C1 and C4 and the first brake B1 are operated at a tenth forward speed D10.

In a state that the first shaft TM1 is connected to the fifth shaft TM5 by operation of the first clutch C1 and the third shaft TM3 is connected to the sixth shaft TM6 by operation of the fourth clutch C4, the torque of the input shaft IS is input to the first shaft TM1.

At the present state, the seventh shaft TM7 is operated as the fixed element by operation of the first brake B1. Therefore, the torque of the input shaft IS is shifted into the tenth forward speed, and the tenth forward speed is output through the output shaft OS connected to the second shaft TM2.

The third and fourth clutches C3 and C4 and the first brake B1 are operated at an eleventh forward speed D11.

In a state that the third shaft TM3 is connected to the fifth shaft TM5 and the sixth shaft TM6 by operation of the third and fourth clutches C3 and C4, the torque of the input shaft IS is input to the first shaft TM1.

At the present state, the seventh shaft TM7 is operated as the fixed element by operation of the first brake B1. Therefore, the torque of the input shaft IS is shifted into the eleventh forward speed, and the eleventh forward speed is output through the output shaft OS connected to the second shaft TM2.

Furthermore, the planetary gear train according to the various exemplary embodiments of the present invention can achieve eleven reverse speeds in a state that the reverse drive gear RDG is connected to the driveshaft DS through the sleeve SLE of the synchronizer SL of the direction changer FRCD. In the instant case, the torque of the engine is transmitted to the input shaft IS with rotational direction change through the reverse drive gear RDG and the reverse driven gear RPG.

The third and fourth clutches C3 and C4 and the second brake B2 are operated at a first reverse speed REV1.

In a state that the third shaft TM3 is connected to the fifth shaft TM5 and the sixth shaft TM6 by operation of the third and fourth clutches C3 and C4, the torque of the input shaft IS is input to the first shaft TM1.

At the present state, the eighth shaft TM8 is operated as the fixed element by operation of the second brake B2. Therefore, the torque of the input shaft IS is shifted into the first reverse speed, and the first reverse speed is output through the output shaft OS connected to the second shaft TM2.

The first and fourth clutches C1 and C4 and the second brake B2 are operated at a second reverse speed REV2.

In a state that the first shaft TM1 is connected to the fifth shaft TM5 by operation of the first clutch C1 and the third shaft TM3 is connected to the sixth shaft TM6 by operation of the fourth clutch C4, the torque of the input shaft IS is input to the first shaft TM1.

At the present state, the eighth shaft TM8 is operated as the fixed element by operation of the second brake B2. Therefore, the torque of the input shaft IS is shifted into the second reverse speed, and the second reverse speed is output through the output shaft OS connected to the second shaft TM2.

The second and fourth clutches C2 and C4 and the second brake B2 are operated at a third reverse speed REV3.

In a state that the second shaft TM2 is connected to the fourth shaft TM4 by operation of the second clutch C2 and the third shaft TM3 is connected to the sixth shaft TM6 by operation of the fourth clutch C4, the torque of the input shaft IS is input to the first shaft TM1.

At the present state, the eighth shaft TM8 is operated as the fixed element by operation of the second brake B2. Therefore, the torque of the input shaft IS is shifted into the third reverse speed, and the third reverse speed is output through the output shaft OS connected to the second shaft TM2.

The first clutch and second clutch C1 and C2 and the second brake B2 are operated at a fourth reverse speed REV4.

In a state that the first shaft TM1 is connected to the fifth shaft TM5 by operation of the first clutch C1 and the second shaft TM2 is connected to the fourth shaft TM4 by operation of the second clutch C2, the torque of the input shaft IS is input to the first shaft TM1.

At the present state, the eighth shaft TM8 is operated as the fixed element by operation of the second brake B2. Therefore, the torque of the input shaft IS is shifted into the fourth reverse speed, and the fourth reverse speed is output through the output shaft OS connected to the second shaft TM2.

The second and third clutches C2 and C3 and the second brake B2 are operated at a fifth reverse speed REV5.

In a state that the second shaft TM2 is connected to the fourth shaft TM4 by operation of the second clutch C2 and the third shaft TM3 is connected to the fifth shaft TM5 by operation of the third clutch C3, the torque of the input shaft IS is input to the first shaft TM1.

At the present state, the eighth shaft TM8 is operated as the fixed element by operation of the second brake B2. Therefore, the torque of the input shaft IS is shifted into the fifth reverse speed, and the fifth reverse speed is output through the output shaft OS connected to the second shaft TM2.

The second, third, and fourth clutches C2, C3, and C4 are operated at a sixth reverse speed REV6.

The second shaft TM2 is connected to the fourth shaft TM4 by operation of the second clutch C2 and the third shaft TM3 is connected to the fifth shaft TM5 and the sixth shaft TM6 by operation of the third and fourth clutches C3 and C4.

At the present time, the first and fourth planetary gear sets PG1 and PG4 and the compound planetary gear set CPG become lock-up states. In the instant case, if the torque of the input shaft IS is input to the first shaft TM1, the torque of the input shaft IS is output through the output shaft OS connected to the second shaft TM2 without rotation speed change.

The second and third clutches C2 and C3 and the first brake B1 are operated at a seventh reverse speed REV7.

In a state that the second shaft TM2 is connected to the fourth shaft TM4 by operation of the second clutch C2 and the third shaft TM3 is connected to the fifth shaft TM5 by operation of the third clutch C3, the torque of the input shaft IS is input to the first shaft TM1.

At the present state, the seventh shaft TM7 is operated as the fixed element by operation of the first brake B1. Therefore, the torque of the input shaft IS is shifted into the seventh reverse speed, and the seventh reverse speed is output through the output shaft OS connected to the second shaft TM2.

The first clutch and second clutch C1 and C2 and the first brake B1 are operated at an eighth reverse speed REV8.

In a state that the first shaft TM1 is connected to the fifth shaft TM5 by operation of the first clutch C1 and the second shaft TM2 is connected to the fourth shaft TM4 by operation of the second clutch C2, the torque of the input shaft IS is input to the first shaft TM1.

At the present state, the seventh shaft TM7 is operated as the fixed element by operation of the first brake B1. Therefore, the torque of the input shaft IS is shifted into the eighth reverse speed, and the eighth reverse speed is output through the output shaft OS connected to the second shaft TM2.

The second and fourth clutches C2 and C4 and the first brake B1 are operated at a ninth reverse speed REV9.

In a state that the second shaft TM2 is connected to the fourth shaft TM4 by operation of the second clutch C2 and the third shaft TM3 is connected to the sixth shaft TM6 by operation of the fourth clutch C4, the torque of the input shaft IS is input to the first shaft TM1.

At the present state, the seventh shaft TM7 is operated as the fixed element by operation of the first brake B1. Therefore, the torque of the input shaft IS is shifted into the ninth reverse speed, and the ninth reverse speed is output through the output shaft OS connected to the second shaft TM2.

The first and fourth clutches C1 and C4 and the first brake B1 are operated at a tenth reverse speed REV10.

In a state that the first shaft TM1 is connected to the fifth shaft TM5 by operation of the first clutch C1 and the third shaft TM3 is connected to the sixth shaft TM6 by operation of the fourth clutch C4, the torque of the input shaft IS is input to the first shaft TM1.

At the present state, the seventh shaft TM7 is operated as the fixed element by operation of the first brake B1. Therefore, the torque of the input shaft IS is shifted into the tenth reverse speed, and the tenth reverse speed is output through the output shaft OS connected to the second shaft TM2.

The third and fourth clutches C3 and C4 and the first brake B1 are operated at an eleventh reverse speed.

In a state that the third shaft TM3 is connected to the fifth shaft TM5 and the sixth shaft TM6 by operation of the third and fourth clutches C3 and C4, the torque of the input shaft IS is input to the first shaft TM1.

At the present state, the seventh shaft TM7 is operated as the fixed element by operation of the first brake B1. Therefore, the torque of the input shaft IS is shifted into the eleventh reverse speed, and the eleventh reverse speed is output through the output shaft OS connected to the second shaft TM2.

Figure 3:
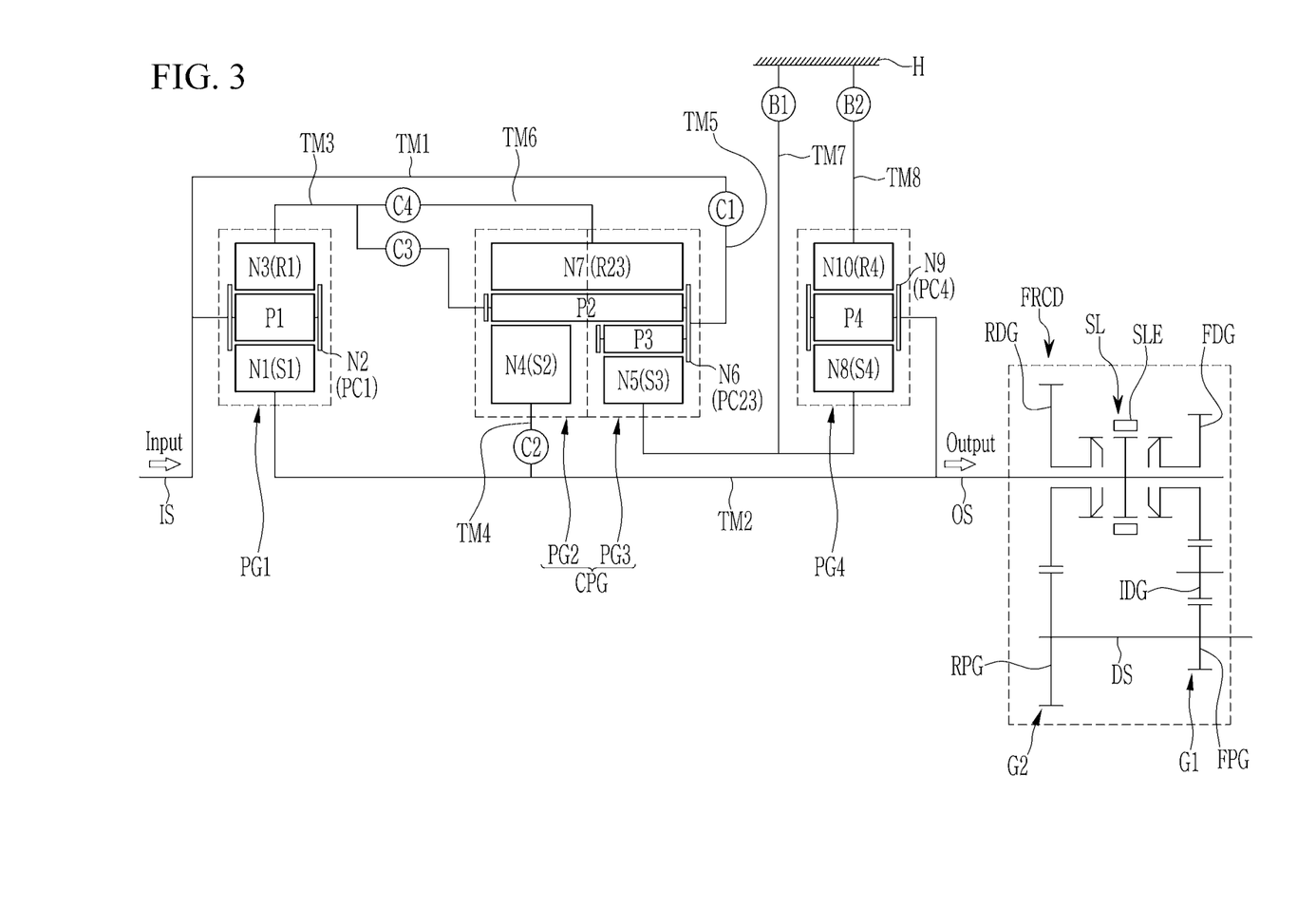
FIG. 3 is a schematic diagram of a planetary gear train according to the various exemplary embodiments of the present invention.

FIG. 3 is a schematic diagram of a planetary gear train according to the various exemplary embodiments of the present invention.

Referring to FIG. 1, the direction changer FRCD is disposed on the input shaft side in the planetary gear train according to the various exemplary embodiments of the present invention. Referring to FIG. 3, the direction changer FRCD is disposed on the output shaft side in the various exemplary embodiments.

That is, the direction changer FRCD includes the driveshaft DS, the forward gear set G1, and the reverse gear set G2, and the driveshaft DS is disposed in parallel with and apart from the output shaft OS. The driveshaft DS can be connected to the differential apparatus.

The forward gear set G1 includes the forward drive gear FDG rotatably disposed on the output shaft OS, a forward driven gear FPG fixedly disposed on the driveshaft DS, and the idle gear IDG disposed between the forward drive gear FDG and the forward driven gear FPG and engaged with the forward drive gear FDG and the forward driven gear FPG.

The reverse gear set G2 may include the reverse drive gear RDG rotatably disposed on the output shaft OS and the reverse driven gear RPG fixedly disposed on the driveshaft DS and engaged with the reverse drive gear RDG.

Furthermore, the synchronizer SL is disposed between the forward drive gear FDG and the reverse drive gear RDG and selectively connects the forward drive gear FDG or the reverse drive gear RPG to the output shaft OS.

Since the synchronizer SL is well-known to a person of an ordinary skill in the art, detailed description thereof will be omitted. A sleeve SLE used in the synchronizer SL, as well-known to a person of an ordinary skill in the art, is driven by an additional actuator, and the actuator is controlled by the transmission control device.

According to the various exemplary embodiments of the present invention, the direction changer FRCD is disposed on the output shaft side and converts the torque changed and output from the planetary gear set into the forward speeds or the reverse speeds. Function and effect of the various exemplary embodiments are substantially the same as those of the various exemplary embodiments, detailed description will be omitted.

According to the exemplary embodiments of the present invention, eleven forward speeds and eleven reverse speeds may be achieved by use of four planetary gear sets PG1, PG2, PG3, and PG4, four clutches C1, C2, C3, and C4, and two brakes B1 and B2.

Furthermore, the planetary gear train according to the first and various exemplary embodiments of the present invention may achieve suitable speed stages according to rotation speed of the engine. Particularly, silent driving of the vehicle may be improved by use of operation point positioned at a low rotation speed region of the engine.

Since the planetary gear train according to the exemplary embodiments of the present invention achieves multi-speed stages of the automatic transmission, driving efficiency of the engine may be maximized and power delivery performance and fuel economy may be improved.

Furthermore, since the planetary gear train according to the exemplary embodiments of the present invention can achieve eleven forward speeds and eleven reverse speeds, the planetary gear train is applicable to industrial machinery including agricultural machinery, construction equipment, etc.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, comprising:
    an input shaft receiving torque of an engine;
    an output shaft outputting torque;
    a direction changer disposed on an input shaft side and transmitting the torque of the engine to the input shaft with or without change of rotation direction, or disposed on an output shaft side and outputting the torque of the output shaft with or without change of rotation direction;
    a first planetary gear set including first, second and third rotation elements;
    a compound planetary gear set including fourth, fifth, sixth, and seventh rotation elements by combining second and third planetary gear sets;
    a fourth planetary gear set including eighth, ninth, and tenth rotation elements;
    a first shaft fixedly connected to the second rotation element and the input shaft;
    a second shaft fixedly connected to the first rotation element and the ninth rotation element, and fixedly connected to the output shaft;
    a third shaft fixedly connected to the third rotation element;
    a fourth shaft fixedly connected to the fourth rotation element;
    a fifth shaft fixedly connected to the sixth rotation element;
    a sixth shaft fixedly connected to the seventh rotation element; and
    a plurality of shafts formed by combinations of remaining rotation elements of the fourth planetary gear set and the compound planetary gear set that are not connected to the first to sixth shafts, and selectively and respectively connected to a transmission housing,
    wherein the plurality of shafts comprise:
        a seventh shaft fixedly connected to the fifth rotation element and the eighth rotation element and selectively connectable to the transmission housing; and
        an eighth shaft fixedly connected to the tenth rotation element and selectively connectable to the transmission housing, and
    wherein the first shaft is selectively connectable to the fifth shaft, the second shaft is selectively connectable to the fourth shaft, the third shaft is selectively connectable to the fifth shaft, and the third shaft is selectively connectable to the sixth shaft.

2. The planetary gear train apparatus of claim 1, further including:

four clutches, each of which selectively connecting two shafts among the first to sixth shafts and the plurality of shafts including a seventh shaft and an eighth shaft; and two brakes, each of which selectively connecting the seventh shaft and the eighth shaft to the transmission housing, respectively.

3. The planetary gear train apparatus of claim 2, wherein the four clutches include:

a first clutch mounted between the first shaft and the fifth shaft;

a second clutch mounted between the second shaft and the fourth shaft;

a third clutch mounted between the third shaft and the fifth shaft; and a fourth clutch mounted between the third shaft and the sixth shaft, and the two brakes include:

a first brake mounted between the seventh shaft and the transmission housing; and a second brake mounted between the eighth shaft and the transmission housing.

4. The planetary gear train apparatus of claim 1, wherein the first planetary gear set is a single pinion planetary gear set, the first rotation element is a first sun gear, the second rotation element is a first planet carrier, and the third rotation element is a first ring gear, the compound planetary gear set is formed by combining the second planetary gear set being a single pinion planetary gear set and the third planetary gear set being a double pinion planetary gear set, the fourth rotation element is a second sun gear, the fifth rotation element is a third sun gear, the sixth rotation element is a common planet carrier, and the seventh rotation element is a common ring gear, and the fourth planetary gear set is a single pinion planetary gear set, the eighth rotation element is a fourth sun gear, the ninth rotation element is a fourth planet carrier, and the tenth rotation element is a fourth ring gear.

5. The planetary gear train apparatus of claim 1, wherein the first and fourth planetary gear sets and the compound planetary gear set are disposed in a sequence of the first planetary gear set, the compound planetary gear set, and the fourth planetary gear set from an engine side thereof.

6. A planetary gear train apparatus of an automatic transmission for a vehicle, comprising:

an input shaft receiving torque of an engine;

an output shaft outputting torque;

a direction changer disposed on an input Shaft side and transmitting the torque of the engine to the input shaft with or without change of rotation direction, or disposed on an output shaft side and outputting the torque of the output shaft with or without change of rotation direction;

a first planetary gear set inclunding first, second and third rotation elements;

a compound planetary gear set including fourth, fifth, sixth, and seventh rotation elements by combining second and third planetary gear sets;

a fourth planetary gear set including eighth, ninth, and tenth rotation elements;

a first shaft fixedly connected to the second rotation element and the input shaft;

a second shaft fixedly connected to the first rotation element and the ninth rotation, element, and fixedly connected to the out shaft;

a third shaft fixedly connected to the third rotation element;

a fourth shaft fixedly connected to the fourth rotation element;

a fifth shaft fixedly connected to the sixth rotation element;

a sixth shaft fixedly connected to the seventh rotation element; and a plurality of shafts formed by combinations of remaining rotation elements of the fourth planetary gear set and the compound planetary gear set that are not connected to the first to sixth shafts, and selectively and respectively connected to a transmission housing, wherein the direction changer is disposed on the input shaft, and includes;

a driveshaft disposed apart from the input shaft and receiving the torque of the engine;

a forward gear set disposed on the driveshaft and selectively transmitting torque of the driveshaft to the input shaft without change of rotation direction;

a reverse gear set disposed on the driveshaft and selectively transmitting the torque of the driveshaft to the input shaft with change of rotation direction; and a synchronizer connecting the driveshaft to the input shaft selectively through the forward gear set or the reverse gear set, wherein the forward gear set includes:

a forward drive gear rotatably disposed on the driveshaft;

a forward driven gear fixedly disposed on the input shaft; and an idle gear disposed between the forward drive gear and the forward driven gear and engaged with the forward drive gear and the forward driven gear, the reverse gear set includes:

a reverse drive gear rotatably disposed on the driveshaft; and a reverse driven gear fixedly disposed on the input shaft and engaged with the reverse drive gear, and the synchronizer is disposed between the forward drive gear and the reverse drive gear and is configured to selectively connect the forward drive gear or the reverse drive gear to the driveshaft.

7. A planetary gear train apparatus of an automatic transmission for a vehicle, comprising:

an input shaft receiving torque of an engine;

an output shaft outputting torque;

a direction changer disposed on an input shaft side and transmitting the torque of the engine to the input shaft with or without change of rotation direction, or disposed on an output shaft side outputting the torque of the output shaft with or without change of rotation direction;

a first planetary gear set including first, second and third rotation elements;

a compound planetary gear set including fourth, fifth, sixth, and seventh rotation elements by combining second and third planetary gear sets;

a fourth planetary near set including eighth, ninth, and tenth rotation elements;

a first shaft fixedly connected to the second rotation element and the input shaft;

a second shaft fixedly connected to the first rotation element and the ninth rotation element, and fixedly connected to the output shaft;

a third shaft fixedly connected to the third rotation element;

a fourth shaft fixedly connected to the fourth rotation element;

a fifth shaft fixedly connected to sixth rotation element;

a sixth shaft fixedly connected to the seventh rotation element; and a plurality of shafts formed by combinations of remaining rotation elements of the fourth planetary gear set and the compound planetary gear set that are not connected to the first to sixth shafts, and selectively and respectively connected to a transmission housing, wherein the direction changer is disposed on the output shaft, and includes:
- a driveshaft disposed apart from the output shaft and outputting the torque of the output shaft with or without change of rotation direction;
- a forward gear set disposed on the output shaft and selectively transmitting the torque of the output shaft to the driveshaft without change of rotation direction;
- a reverse gear set disposed on the output shaft and selectively transmitting the torque of the output shaft to the driveshaft with change of rotation direction; and
- a synchronizer connecting the output shaft to the driveshaft selectively through the forward gear set or the reverse gear set, and wherein the forward gear set includes:
- a forward drive gear rotatably disposed on the output shaft;
- a forward driven gear fixedly disposed on the driveshaft; and
- an idle gear disposed between the forward drive gear and the forward driven gear and engaged with the forward drive gear and the forward driven gear, the reverse gear set includes:
- a reverse drive gear rotatably disposed on the output shaft; and
- a reverse driven gear fixedly disposed on the driveshaft and engaged with the reverse drive gear, and the synchronizer is disposed between the forward drive gear and the reverse drive gear and is configured to selectively connect the forward drive gear or the reverse drive gear to the output shaft.

8. A planetary gear train apparatus of an automatic transmission for a vehicle, comprising:

an input shaft receiving torque of an engine;

an output shaft outputting torque;

a direction changer disposed on an input shaft side and transmitting the torque of the engine to the input shaft with or without change of rotation direction, or disposed on an output shaft side and outputting the torque of the output shaft with or without change of rotation direction;

a first planetary gear set including a first rotation element, a second rotation element, and a third rotation element;

a compound planetary gear set including fourth, fifth, sixth, and seventh rotation elements by combining second and third planetary gear sets; and a fourth planetary gear set including eighth, ninth, and tenth rotation elements, wherein the first rotation element is fixedly connected to the ninth rotation element and is fixedly connected to the output shaft, the second rotation element is fixedly connected to the input shaft and is selectively connectable to the sixth rotation element, the third rotation element is selectively connectable to the sixth rotation element and the seventh rotation element, respectively, the fourth rotation element is selectively connectable to the first rotation element, the fifth rotation element is fixedly connected to the eighth rotation element and is selectively connectable to a transmission housing, and the tenth rotation element is selectively connectable to the transmission housing.

9. The planetary gear train apparatus of claim 8, further including:

four clutches, each selectively connecting one rotation element to another rotation element among the first, second, third, fourth, sixth, seventh, and ninth rotation elements; and two brakes, each selectively connecting the eighth rotation element or the tenth rotation element to the transmission housing.

10. The planetary gear train apparatus of claim 9, wherein the four clutches include:

a first clutch mounted between the second rotation element and the sixth rotation element;

a second clutch mounted between the first rotation element and the fourth rotation element;

a third clutch mounted between the third rotation element and the sixth rotation element; and a fourth clutch mounted between the third rotation element and the seventh rotation element, and the two brakes include:

a first brake mounted between the eighth rotation element and the transmission housing; and a second brake mounted between the tenth rotation element and the transmission housing.

11. The planetary gear train apparatus of claim 8, wherein the first planetary gear set is a single pinion planetary gear set, the first rotation element is a first sun gear, the second rotation element is a first planet carrier, and the third rotation element is a first ring gear, the compound planetary gear set is formed by combining the second planetary gear set being a single pinion planetary gear set and the third planetary gear set being a double pinion planetary gear set, the fourth rotation element is a second sun gear, the fifth rotation element is a third sun gear, the sixth rotation element is a common planet carrier, and the seventh rotation element is a common ring gear, and the fourth planetary gear set is a single pinion planetary gear set, the eighth rotation element is a fourth sun gear, the ninth rotation element is a fourth planet carrier, and the tenth rotation element is a fourth ring gear.

12. The planetary gear train apparatus of claim 8, wherein the first and fourth planetary gear sets and the compound planetary gear set are disposed in a sequence of the first planetary gear set, the compound planetary gear set, and the fourth planetary gear set from an engine side thereof.

13. The planetary gear train apparatus of claim 8, wherein the direction changer is disposed on the input shaft, and includes:

a driveshaft disposed apart from the input shaft and receiving the torque of the engine;

a forward gear set disposed on the driveshaft and selectively transmitting torque of the driveshaft to the input shaft without change of rotation direction;

a reverse gear set disposed on the driveshaft and selectively transmitting the torque of the driveshaft to the input shaft with change of rotation direction; and a synchronizer connecting the driveshaft to the input shaft selectively through the forward gear set or the reverse gear set.

14. The planetary gear rain apparatus of claim 13, wherein the forward gear set includes:
a forward drive gear rotatably disposed on the driveshaft;
a forward driven gear fixedly disposed on the input shaft; and
an idle gear disposed between the forward drive gear and the forward driven gear and engaged with the forward drive gear and the forward driven gear,
the reverse gear set includes:
a reverse drive gear rotatably disposed on the driveshaft; and
a reverse driven gear fixedly disposed on the input shaft and engaged with the reverse drive gear, and
the synchronizer is disposed between the forward drive gear and the reverse drive gear and is configured to selectively connect the forward drive gear or the reverse drive gear to the driveshaft.

15. The planetary gear train apparatus of claim 8, wherein the direction changer is disposed on the output shaft, and includes:
a driveshaft disposed apart from the output shaft and outputting the torque of the output shaft with or without change of rotation direction;
a forward gear set disposed on the output shaft and selectively transmitting the torque of the output shaft to the driveshaft without change of rotation direction;
a reverse gear set disposed on the output shaft and selectively transmitting the torque of the output shaft to the driveshaft with change of rotation direction; and
a synchronizer connecting the output shaft to the driveshaft selectively through the forward gear set or the reverse gear set.

16. The planetary gear train apparatus of claim 15, wherein
the forward gear set includes:
a forward drive gear rotatably disposed on the output shaft;
a forward driven gear fixedly disposed on the driveshaft; and
an idle gear disposed between the forward drive gear and the forward driven gear and engaged with the forward drive gear and the forward driven gear,
the reverse gear set includes:
a reverse drive gear rotatably disposed on the output shaft; and
a reverse driven gear fixedly disposed on the driveshaft and engaged with the reverse drive gear, and
the synchronizer is disposed between the forward drive gear and the reverse drive gear and is configured to selectively connect the forward drive gear or the reverse drive gear to the output shaft.

* * * * *